United States Patent [19]

Haas

[11] 3,762,927
[45] Oct. 2, 1973

[54] SILVER HALIDE EMULSION CONTAINING A NON-MIGRATORY HARDENER

[75] Inventor: Howard C. Haas, Arlington, Mass.

[73] Assignee: Polaroid Corporation, Cambridge, Mass.

[22] Filed: Sept. 30, 1971

[21] Appl. No.: 185,433

Related U.S. Application Data

[62] Division of Ser. No. 862,929, Oct. 1, 1969, abandoned.

[52] U.S. Cl. .................... 96/111, 260/112, 260/117
[51] Int. Cl. ............................................... G03c 1/30
[58] Field of Search ..................... 96/111; 260/117, 260/112

[56] References Cited
UNITED STATES PATENTS

| | | | |
|---|---|---|---|
| 3,396,029 | 8/1968 | Himmelmann et al. | 96/111 |
| 3,396,030 | 8/1968 | Haas | 96/114 |
| 2,657,192 | 10/1953 | Miller et al. | 260/67 |
| 3,442,655 | 5/1969 | Blank | 96/111 |
| 3,306,750 | 2/1967 | Minsk et al. | 96/111 |

Primary Examiner—Norman G. Torchin
Assistant Examiner—Won H. Louie, Jr.
Attorney—John P. Morley et al.

[57] ABSTRACT

A copolymer soluble in aqueous and/or partially aqueous solution and having a chain comprising the entities A and B defined below:

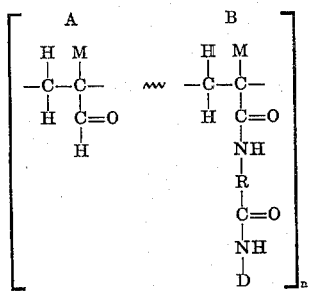

wherein:
 M is hydrogen or methyl;
 R is an alkylene group comprising less than six carbon atoms or a substituted alkylene group;
 each D is hydrogen, methyl or ethyl; and
 $n$ is the total number of A and B residues in the polymer chain.

The copolymers are useful as hardeners for protein-containing emulsions, especially, for example, gelatin emulsions employed in the photographic art. The copolymers of the present invention can also be advantageously employed to selectively adjust the viscosity of protein-containing emulsions to predetermined levels.

3 Claims, No Drawings

SILVER HALIDE EMULSION CONTAINING A NON-MIGRATORY HARDENER

CROSS-REFERENCE TO RELATED APPLICATIONS

This application is a divisional of U. S. Pat. application Ser. No. 862,929 filed Oct. 1, 1969, now abandoned

BACKGROUND OF THE INVENTION

1. Field of the Invention

This invention relates to copolymers. More precisely, the invention disclosed herein relates to synthetic copolymers useful as hardeners for protein-containing emulsions such as gelatin emulsions employed in photographic processes.

2. Description of the Prior Art

Protein-containing emulsions, especially gelatin-containing emulsions, are known products of commerce routinely employed in the photographic art, for example, as light-sensitive silver halide emulsion layers. As those skilled in the art know, such layers encounter processing condtions which can cause swelling or degradation of the gelatin or which can otherwise adversely affect or impair the desired properties of the gelatin layer. In order to avoid or at least compensate for this problem, hardeners which can reduce swelling of the protein are included in emulsions used for forming such layers.

The term "hardeners" is not precisely defined in the art. However, as those skilled in the art will agree, the effect of including a "hardener" in a protein-containing emulsion is evidenced by a decrease in the swellability of the protein emulsion after coating, or an increase in the viscosity of the emulsion before coating. It is in this context that the term "hardener" is employed in the present invention, since in one aspect, the copolymers are employed as hardeners in a conventional sense, e.g., to reduce the swellability of portein-containing coatings or layers and protect the layers or coatings during processing conditions. However, in another aspect, the copolymers can be advantageously employed to selectively adjust the viscosity of protein-containing emulsions to a predetermined level so that the emulsion can be conveniently cast or formed as a coating or layer on a substrate.

In general, hardeners known to the art to be useful in gelatin layers are classified as follows:

1. Metallic salts such as those of chromium, aluminum or zirconium;
2. Aldehydes, or dialdehydes such as formaldehyde or mucochloric acid;
3. 1, 2 or 1,4 diketones such as cyclohexane-1,2-dione;
4. Quinones; and
5. Higher molecular weight hardening agents such as oxidation products of starch and semiesters of maleic acids with polyvinyl alcohol or water-soluble bisulfite compounds of polyacrolein.

The use of the above-mentioned hardening agents has not met with the complete degree of success desired in all instances. For example, some of the hardeners are volatile or can otherwise migrate during processing and cause unwanted staining or discoloration. Others have a tendency to fog the light-sensitive emulsion layer or cause loss of speed. Moreover, some tend to increase the brittleness of the gelatin layer, especially during protracted storage. Accordingly, there is a need outstanding in the art for improved hardeners, especially those which are non-migratory in nature and which can provide improved mechanical properties and water resistance for protein-containing layers, especially at elevated temperatures.

Recently, in U.S. Pat. Nos. 3,382,077 and 3,396,029, non-migratory hardeners have been presented to the art. Essentially, the hardeners described in U.S. Pat. No. 3,382,077 are addition products or acrolein with high molecular weight hydroxy group-containing compounds such as polyvinyl alcohols, derivatives thereof and the like. The addition products contain free aldehyde groups attached to the polymeric chain and the groups can harden gelatin or like proteins.

A non-migratory type hardener is also described in U.S. Pat. No. 3,396,026. Essentially, the hardener described therein is a copolymer comprising acrolein and a comonomer containing carboxylic groups. The preferred hardeners are copolymers containing about 50 to 95 parts by weight acrolein and about 5 to 50 parts by weight of a copolymerizable carboxylic acid such as acrylic acid, methacrylic acid or maleic acid. Especially preferred are copolymers containing 80 to 95 parts by weight of acrolein and 5 to 20 parts by weight of acrylic acid and/or methacrylic acid.

The above-described non-migratory hardeners are employed in conventional manners. In other words, they are included in protein-containing emulsions which are subsequently cast in the form of films or coatings which manifest reduced swellability under processing conditions. However, the above-mentioned prior art does not discuss the use of such hardeners as a means for controlling or adjusting the viscosity of protein-containing emulsions prior to the casting or coating steps. As mentioned, one aspect of the present invention involves the use of the novel non-migratory hardeners described herein to selectively adjust the viscosity of protein-containing emulsions to predetermined levels.

SUMMARY OF THE INVENTION

In accordance with the practice of the present invention, improved hardeners for protein-containing emulsions are presented to the art. Essentially, the improved hardeners are synthetic copolymers which are especially compatible with gelatin and can be included in gelatin-containing emulsions to provide gelatin layers or coatings of improved water resistance and mechanical properties. Alternatively, the copolymers of the present invention can be advantageously employed to control or selectively adjust the viscosity of gelatin-containing emulsions to a predetermined level prior to the coating or casting of such emulsions on substrates. The hardeners of the present invention are essentially defined as water-soluble copolymers having a chain comprising the entities A and B defined below:

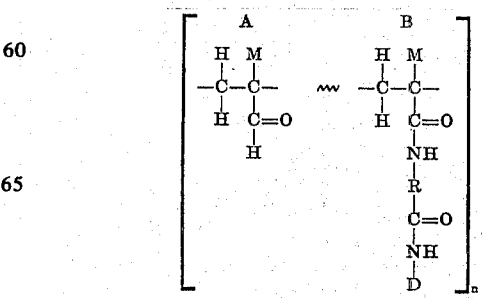

wherein:

M is hydrogen or methyl;

R is an alkylene group comprising less than six carbon atoms;

D is hydrogen, methyl or ethyl; and n is the total number of A and B residues in the polymer chain.

As those skilled in the art will appreciate, the entity A is the polymerized residue of the monomer acrolein or methacrolein, while the entity B is a polymerized residue of monomers of the type described in detail in U.S. Pat. No. 3,396,030 to Howard C. Haas. As disclosed in said patent, specific examples of such monomers include the following:

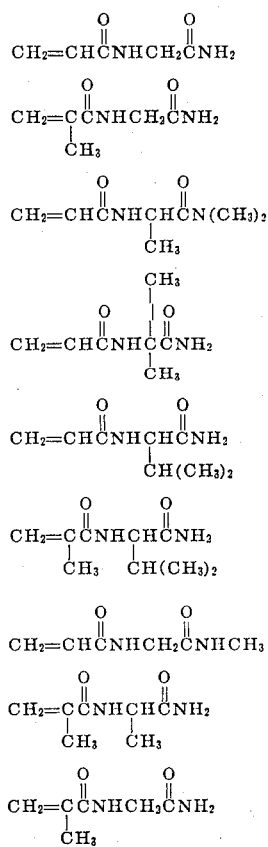

The improved hardeners of the present invention are especially compatible with gelatino-silver halide photographic layers. For example, they can be intimately dispersed readily in the gelatin matrix and yet are non-migratory. Accordingly, discoloration caused by the known volatile or migratory hardeners is virtually eliminated. Also, solutions of gelatin and the hardeners of the present invention are surprisingly clear and transparent and free of turbidity or cloudiness. Further such photographic properties as the speed and fog level of the emulsion are substantially unaffected. Quite surprisingly, in the preferred hardeners of the present invention, the ratio of A entities to B entities is less than about 1:1 and preferably in the range of about 1:5. This is in marked contrast to the copolymers of U.S. Pat. No. 3,396,029, wherein the ratio of acrolein to comonomer is at least 1:1 and preferably above about 4:1.

This feature may be due in part to the compatability of the copolymers of the present invention and gelatin or like proteins.

The hardeners of the present invention are particularly useful for providing protein-containing layers employed in photographic systems which utilize the principles of photography known as diffusion transfer. In such photographic systems, either a black-and-white or a color print may be obtained, depending upon the particular photographic procedures employed.

Black-and-white images may be obatined in accordance with the silver transfer procedures described and claimed, for example, in U.S. Pat. Nos. 2,543,181 and 2,647,056, issued to Edwin H. Land. As is described and claimed in these patents, an exposed light-sensitive gelatino silver halide emulsion containing a developable image is developed with an aqueous alkaline processing composition including a silver halide developing agent and a silver halide solvent; as a function of development, an imagewise distribution of a soluble silver complex is formed in terms of unexposed areas of the emulsion; and this imagewise distribution is then transferred, at least in part, by imbibition, to a superposed silver receptive stratum where it is reduced to impart thereto a positive silver transfer image.

Color transfer images may be obtained in accordance with the procedures described and claimed, for example, in U.S. Pat. No. 2,983,606, issued to Howard G. Rogers. As is disclosed in this patent, a photosensitive element including one or more light-sensitive gelatino silver halide emulsions, each having associated therewith a dye developer (a dye which is also a silver halide developing agent) is exposed and developed with an aqueous alkaline processing composition; as a function of development, an imagewise distribution of diffusible dye is formed; and this imagewise distribution is then transferred, at least in part, by imbibition to a superposed dyeable stratum to impart thereto a positive dye transfer image.

As stated, the entity A of the improved hardeners of the present invention is the polymerized residue of the monomer acrolein or methacrolein, which are known products of commerce, and the manners for preparing same are well known to the art. Also, the manners for producing monomers which undergo polymerization to provide entity B are known. For example, suitable methods are described in U.S. Pat. No. 3,396,030.

The improved hardeners of the present invention are copolymers which are soluble in aqueous or partially aqueous solutions and comprise the above described entities A and B distributed along the polymer skeleton chain. The preferred copolymers are water-soluble and are most conveniently prepared by polymerizing the monomers in a solution comprising water and a low molecular weight alcohol, e.g., methanol, ethanol, isopropanol, etc. The polymerization may be catalyzed by various means, including heat, ultraviolet light, and free radical catalysts. In an especially preferred embodiment, free radical catalysts are employed such as azobisisobutyronitrile, diazoaminobenzene, benzoyl peroxide, tertiary butyl peroxide, diacetyl peroxide, diethyl peroxycarbonate, hydrogen peroxide, potassium persulfate and others which could be mentioned.

Although in a preferred embodiment the polymerization is carried out in a solvent, it is contemplated that when desired, and depending upon the particular monomers used, bulk polymerization techniques may be employed. Bulk polymerization may involve polymerization of the melt or crystals by methods well known to polymer chemists. Additionally, the monomers may be polymerized in solution at room temperature using redox initiators such as mixtures of persulfates and bisulfites. The amount of catalysts and the temperature at which the polymerization is carried out may be varied to suit particular needs. Generally, the polymerization will proceed at a satisfactory rate by carrying out the polymerization about 25° to 100° C. using 0.1 percent to about 2.0 percent catalyst (based on the weight of the monomer charge).

In one aspect of the invention, the novel copolymers can be employed as improved hardeners and solutions thereof can be conveniently added to gelatin or protein-containing emulsions. The mixture can then be cast in the form of a layer, coating or film useful in photographic products as auxiliary layers, antistatic layers, protective layers and, most preferably, at light-sensitive gelatino-silver halide layers. The amount of hardener employed in a given mixture may vary and will depend primarily on the ultimate degree of hardness desired in the protein-containing layer in which the hardener(s) are included. For example, a degree of hardening in gelatin-containing layers may be detected when as little as 0.1 percent by weight of hardener based on the weight of gelatin is employed. However, amounts of hardener between about 0.5 to about 5.0 percent by weight based on the gelatin are suitable for most purposes. The illustrative amounts mentioned above refer to copolymers of a molecular weight between 5,000 to 200,000, e.g., wherein $n$ is between about 25 to about 1,000 and the ratio of A to B is about 1:9.

Emulsions or dispersions comprising the protein material and improved hardeners of the present invention can be cast in the form of layers, coatings or films on various supports including other protein-containing films or coatings or can be cast directly on pellucid, e.g., transparent or translucent substrates. Such substrates include glass, paper or those fabricated of the various plastomeric materials known to the photographic art. It is also to be understood that gelatino-silver halide emulsions comprising the improved hardeners can include any of the light-sensitive silver salts, and the emulsions can provide layers which are sensitized, fogged or contain preselected auxiliary ingredients which are employed for a wide variety of specialized purposes in the photographic art.

As mentioned hereinbefore, the copolymers of the present invention can also be advantageously employed to control and/or selectively adjust the viscosity of protein-containing emulsions to predetermined levels prior to the casting of such emulsions in the form of layers or coatings. Those skilled in the art of preparing gelatin emulsions, for example, know that despite precautions, the ultimate viscosity of a prepared emulsion is oftentimes unpredictable. In some instances, for example, the viscosity is well below that expected. Accordingly, the emulsion is unsuitable for preparing coatings or layers conveniently. Instead, additional gelatin must be added to attain the desired viscosity or degree of body so that the emulsion can be employed in coating processes and/or apparatus involved in such processes. The addition of gelatin at this point in the preparation is undesirable since it alters and affects existing ratios between the gelatin and other components which may be included in the emulsion. For example, if a silver halide is a component of the emulsion, additional silver halide must be included to maintain the initial gelatin/silver halide ratio.

The copolymers of the present invention can be employed to directly increase the viscosity or "body" of protein-containing emulsions without the addition of protein to the emulsion. For example, the rate of hardening activity of the copolymers of the present invention is somewhat dependent on the pH of the emulsions. At pH below about 7.0, the rate of hardening is very slow, while at pH 9.0 or above, the rate is quite rapid.

In a routine procedure involving this aspect of the present invention, a hardening amount of copolymers of the present invention is added to an emulsion having a viscosity which is too low to be conveniently employed in the casting or coating of layers. The pH of the mixture of copolymer and emulsion is then adjusted to about pH 9 in known manners and the viscosity of the mixture is monitored until the viscosity reaches or closely approximates that desired, whereupon the pH of the mixture is reduced to about 7.0 and the mixture is cast or coated in the form desired. Accordingly, in this aspect of the present invention, the copolymers are employed to control or selectively adjust the viscosity of protein-containing emulsions to a predetermined level.

DESCRIPTION OF THE PREFERRED EMBODIMENTS

The invention and manner of practicing same will be better appreciated by reference to the following Example which describes a preferred embodiment thereof.

EXAMPLE

A water-soluble copolymer of the present invention was prepared as follows: 9.2 grams acrylyl glycinamide and 0.85 grams of methacrolein were copolymerized in a solvent of 30 cc. methyl alcohol and 3 cc. of water, and containing 0.03 grams azobisisobutyronitrile as initiator. The copolymerization was conducted at 60° C. for 24 hours. After the copolymerization was terminated, the polymerization mixture was treated with methyl alcohol and the polymer filtered off. The copolymer was purified by dissolving the copolymer in water, and reprecipitated by pouring the water solution into acetone. The copolymer was again filtered off, washed thoroughly with methyl alcohol and dried under vacuum.

The dried copolymer can be dissolved in water and added to a gelatino silver halide emulsion. The mixture can be cast on a suitable substrate to provide a layer which will manifest a desirable degree of hardness.

As mentioned before and as those skilled in the art will appreciate, the ultimate degree of hardness obtained in layers comprising the copolymers of the present invention will depend upon such factors as the number of free aldehyde groups available in the copolymer included in the emulsion, the pH of the mixture of emulsion and copolymer and the temperature of drying of the layer. However, for a given pH and temperature of drying, the degree of hardness will depend primarily on the number of free aldehyde groups in the copolymer. In turn, the number of free aldehyde groups is a function of the amount of copolymer added to the emulsion and the ratio of A to B entities in the copolymer. It is to be understood that these factors can be preselected to provide a predetermined degree of hardness in protein-containing layers.

Various modifications of features of the above Example offered to the purpose of illustrating a preferred embodiment of the present invention may be employed without departing from the spirit and scope of the invention defined in the appended claims. For example, suitable copolymers useful as hardeners may be obtained by substituting acrolein or a mixture of methacrolein and acrolein for the methacrolein of the above Example. Also, any of the diverse monomers or mixtures thereof which, as described before, can qualify to provide entity B can be substituted for the acrylylglycinimide of the above Example to provide copolymers of the present invention having specialized applications and properties.

Other solvent systems can be employed in preparing the copolymers, although partially aqueous solvents comprising low molecular weight alcohols are especially preferred. Also, various ratios of the comonomers can be employed to produce copolymers wherein the ratio of A to B entities can vary from 0.1:10 to 10:.5, but, as mentioned before and as described in the preferred embodiment, the preferred copolymers are those wherein the ratio of A to B is less than about 1:1 and preferably in the range of less than about 1:5. Other modifications will be apparent to those skilled in the art from the foregoing teachings and description of the invention defined in the claims hereinafter.

Since certain changes may be made in the above product without departing from the scope of the invention herein involved, it is intended that all matter contained in the above description shall be interpreted as illustrative and not in a limiting sense. What is claimed is:

1. A photographic element comprising a light sensitive silver halide emulsion layer containing gelatin as a binder and a copolymer as a hardener for said binder, said copolymer consisting essentially of the entities A and B as defined below:

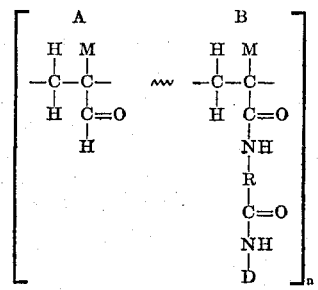

wherein:
M is hydrogen or methyl;
n is the total number of A and B residues in the polymer chain and is an integer between about 25 to about 1,000; and
the ratio of A to B entities is less than about 1:5.

2. A photographic element comprising a light sensitive silver halide emulsion layer containing a water swellable portein as a binder and a copolymer as a hardener for said binder, said copolymer consisting essentially of the entities A and B as defined below:

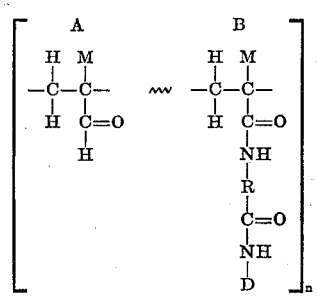

wherein:
M is hydrogen or methyl;
R is an alkylene group comprising less than six carbon atoms;
D is hydrogen, methyl or ethyl;
n represents the total number of A and B residues in the polymer chain and is an integer between about 25 to about 1,000 and
wherein: the ratio of A entities to be entities of copolymers is less than about 1:1.

3. A layer of claim 2 wherein the ratio of said A entities to said B entities is less than about 1:5.

* * * * *